(No Model.)
C. H. MILLER.
BICYCLE ATTACHMENT.
No. 512,044. Patented Jan. 2, 1894.
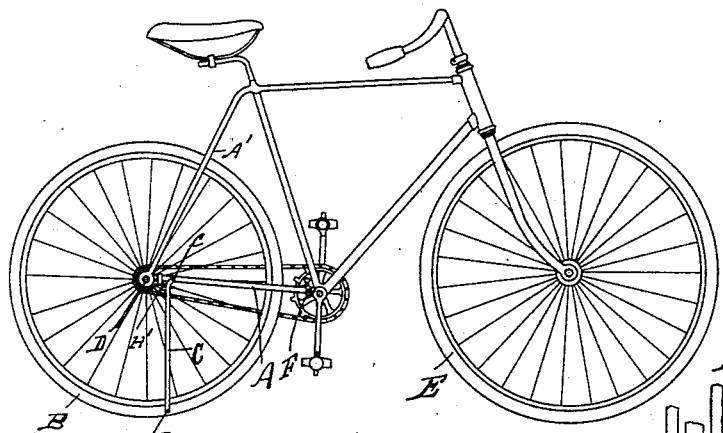
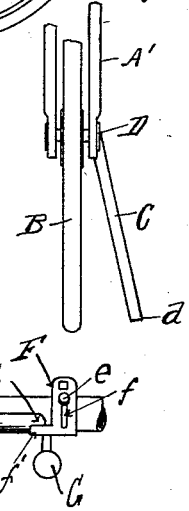
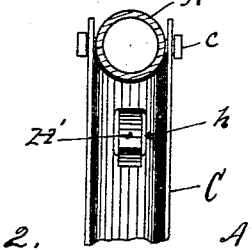
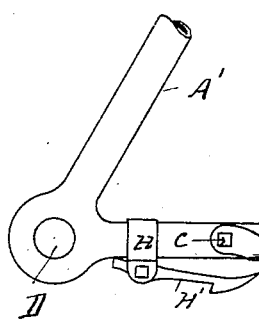
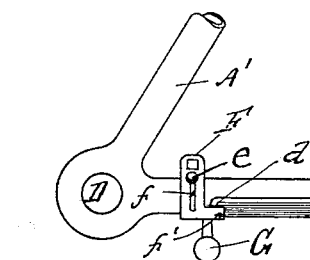
WITNESSES.
F. Einfeldt
Ralph A. Sturgeon.
INVENTOR.
Charles H. Miller
By Jos Sturgeon
Atty

UNITED STATES PATENT OFFICE.

CHARLES H. MILLER, OF ERIE, PENNSYLVANIA.

BICYCLE ATTACHMENT.

SPECIFICATION forming part of Letters Patent No. 512,044, dated January 2, 1894.

Application filed August 22, 1893. Serial No. 483,781. (No model.)

*To all whom it may concern:*

Be it known that I, CHARLES H. MILLER, a citizen of the United States, residing at the city of Erie, in the county of Erie and State of Pennsylvania, have invented certain new and useful Improvements in Bicycle Attachments; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvement in bicycle attachments hereinafter set forth and explained and illustrated in the accompanying drawings, in which—

Figure 1. is a side elevation of a bicycle embodying my improved attachment. Fig. 2. is a side elevation of one of the side bars of a bicycle showing the attachment folded up thereon. Fig. 3. is a detail rear view of a portion of a bicycle embodying my invention. Fig. 4. is a detail view transverse section of the side bar with the attachment down. Fig. 5. is a side elevation of one of the side bars of a bicycle, showing a modification of my device.

In Fig. 1 of the drawings, I show a bicycle of ordinary construction, upon the side-bar A on the opposite side of the wheel B from the sprocket wheel and chain mechanism, I hinge a standard or leg C on a pivot $c$, preferably at the rear portion of the side-bar A adjacent to the bearing D therein of the rear wheel B. This leg or standard C is so pivoted to the side-bar A that when down in the position shown in Figs. 1 and 3, it projects downward and outward at an angle of say about twenty degrees from the side of the wheel B. The length of the standard or leg C is made preferably about the length of the radius of the wheel B, so that when the leg or standard C is down, by leaning the bicycle slightly toward the side thereof to which the leg or standard C is attached, the lower end of the standard C will rest on the ground and form a lateral support for the bicycle, and it will then stand upright upon the wheels B and E thereof and the leg or standard C. This leg or standard C I preferably make of a semi-circular section of pipe, so that when folded up against the side-bar A, it fits closely around it.

Around the side-bar A at the point thereon to which the end $d$ of the leg C reaches, I secure a rotating catch F which is preferably secured in place by a set screw $e$ passing through a slot $f$ in the catch F, so as to prevent endwise movement thereof, yet allow it to be rotated the length of said slot $f$; on the under side of the catch F is a lip $f'$ adapted to pass under the end $d$ of the standard or leg C when folded up, and retain it in such position when turned around by means of the weighted handle G thereon.

Secured to the side-bar A, just behind the pivot $c$, is a clamp H, and pivoted therein is a hook H' adapted to pass through a hole $h$ in the standard or leg C when down and retain it in a rigid position.

In Fig. 5, I show the standard or leg C pivoted to the front end of the side-bar A instead of the rear end thereof. In all other respects, however, this construction is the same as that hereinbefore described.

Having thus fully described my invention, so as to enable others to construct and use the same, what I claim as new, and desire to secure by Letters Patent of the United States, is—

1. The combination with one of the side-bars of a bicycle, of a semi-circular leg or standard hinged to and adapted to be closed up against, and embrace the lower portion of the side-bar; a latch adapted to engage and retain said leg or standard in position when down, and a catch for retaining said leg or standard in an up raised position substantially as and for the purpose set forth.

2. The combination with one of the side-bars of a bicycle, of a semi-tubular leg or standard hinged thereto, a rotating catch on said side-bar for retaining said leg or standard folded up against said side-bar, and a latch hook adapted to pass through and engage an opening in said leg or standard when down and in use, substantially as set forth.

In testimony whereof I affix my signature in presence of two witnesses.

CHARLES H. MILLER.

Witnesses:
   H. J. CURTZE,
   F. EINFELDT.